(12) United States Patent
Leinfellner et al.

(10) Patent No.: US 8,645,918 B2
(45) Date of Patent: Feb. 4, 2014

(54) INFLUENCING DEVICE FOR CONTROL APPARATUS

(75) Inventors: Robert Leinfellner, Paderborn (DE); Ortwin Ludger Franzen, Bad Lippspringe (DE); Hans-Guenter Limberg, Paderborn (DE); Marc Dressler, Horn (DE); Paul Gruber, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 1024 days.

(21) Appl. No.: 10/598,946

(22) PCT Filed: Mar. 15, 2005

(86) PCT No.: PCT/EP2005/002742
§ 371 (c)(1),
(2), (4) Date: Aug. 31, 2007

(87) PCT Pub. No.: WO2005/091089
PCT Pub. Date: Sep. 29, 2005

(65) Prior Publication Data
US 2008/0065239 A1 Mar. 13, 2008

(30) Foreign Application Priority Data

Mar. 15, 2004 (DE) .......................... 10 2004 012 738
Jun. 2, 2004 (DE) .......................... 10 2004 027 033

(51) Int. Cl.
*G06F 9/44* (2006.01)

(52) U.S. Cl.
USPC ............ 717/124; 717/125; 717/127; 717/135

(58) Field of Classification Search
None
See application file for complete search history.

(56) References Cited

U.S. PATENT DOCUMENTS 6,145,122 A 11/2000 Miller et al.
6,826,746 B2 * 11/2004 Evans et al. .................... 717/124
(Continued)

FOREIGN PATENT DOCUMENTS

DE 10030988 A1 1/2002
DE 10106504 A1 8/2002
(Continued)

OTHER PUBLICATIONS

Nakano et al., Task oriented visual interface for debugging timing problems in hardware design, May 2004, 4 pages.*

(Continued)

*Primary Examiner* — Thuy Dao
(74) *Attorney, Agent, or Firm* — Orrick Herrington & Sutcliffe, LLP (57) ABSTRACT

An adjustment device for adjusting at least one control device with at least one control device microcontroller and with at least one control device debug interface, where the adjustment device comprises at least one programmable unit, at least one data transmission interface for connecting the adjustment device to an operating unit, and at least one adjustment device debug interface for connecting the adjustment device to the control device debug interface of the control device. The adjustment device according to the invention accomplishes the objective of reducing the load on the control device due to control device application by at least one address list and at least one data list, which are provided in a memory of the adjustment device.

17 Claims, 3 Drawing Sheets

(56) References Cited

U.S. PATENT DOCUMENTS

| | | | |
|---|---|---|---|
| 7,024,660 B2 * | 4/2006 | Andrade et al. | 717/124 |
| 7,162,713 B2 * | 1/2007 | Pennello | 717/124 |
| 7,188,338 B2 * | 3/2007 | Ito | 717/135 |
| 7,251,808 B2 * | 7/2007 | Bates et al. | 717/125 |
| 7,370,319 B2 * | 5/2008 | Pensak et al. | 717/124 |
| 7,669,186 B2 * | 2/2010 | Nolan et al. | 717/124 |
| 2002/0144235 A1 | 10/2002 | Simmers et al. | |
| 2003/0066053 A1 * | 4/2003 | Al-Azzawe | 717/127 |
| 2003/0074650 A1 * | 4/2003 | Akgul et al. | 717/129 |
| 2003/0154322 A1 | 8/2003 | Wagner | |
| 2003/0171905 A1 | 9/2003 | Wagner et al. | |
| 2004/0054944 A1 * | 3/2004 | Bates et al. | 714/38 |
| 2005/0066310 A1 * | 3/2005 | Creamer et al. | 717/127 |
| 2006/0178804 A1 | 8/2006 | Laichinger et al. | |

FOREIGN PATENT DOCUMENTS

| | | |
|---|---|---|
| DE | 10228610 A1 | 1/2003 |
| DE | 10235610 A1 | 2/2004 |
| DE | 10303490 A1 | 8/2004 |

OTHER PUBLICATIONS

Datta et al., On-chip delay measurement for silicon debug, Apr. 2004, 4 pages.*

PCT Search Report and Written Opinion for PCT/EP2005/002742, dated Aug. 11, 2005 (with English machine translation).

The Nexus 5001 Forum, Standard for a Global Embedded Processor Debug Interface, Version 2.0, IEEE—Industry Standards & Tech. Org., Piscataway, NJ, Dec. 23, 2003.

Otterbach, R., et al., "Rapid Control Prototying—neue Möglichkeiten und Werkzeuge" (discussed in PCT Written Opinion for PCT/EP2005/002742, dated Aug. 11, 2005).

Hanselmann, Herbert, "Automotive Control: From Concept to Experiment to Product", Dearborn, MI, Proceedings of 1996 IEEE Int'l Symposium, Sep. 15-18, 1996.

Newport, Danny and Don Bouldin, "Using Configurable Computing Systems, The Computer Engineering Handbook" 2002, XP-002334293.

German Search Report, for German Application No. 102004027033.3, dated Nov. 2004 (with English machine translation).

Goroncy, Von Jurgen, et al., "Austausch in bewahrter Form",ETAS Inside (discussed in German Search Report, for German Application No. 102004027033.3, dated Nov. 2004).

"Whitepaper Applikations—und Meβsysteme", ETAS Engineering Tools, 1998 ETAS GmbH & Co.KG, Stuttgart (English version of the publication is provided).

Schauffele, Jorg, "Automotive Software Engineering", ATZ-MTZ-Fachbuch, 2003/2004 (English translation is provided).

* cited by examiner

INFLUENCING DEVICE FOR CONTROL APPARATUS

RELATED APPLICATION(S)

Applicants hereby claim priority under 35 USC §119 for PCT/EP05/02742, WO 2005/091089 A1 filed Mar. 15, 2005 and published Sep. 29, 2005, entitled "INFLUENCING DEVICE FOR CONTROL APPARATUS" which claims priority to German Application Nos. 10 2004 012 738.7 and 10 2004 027 033.3 all incorporated herein by reference.

FIELD OF THE INVENTION

The invention relates to an adjustment device for adjusting at least one control device with at least one control device microcontroller and with at least one control device debug interface, where the adjustment device comprises at least one programmable unit, at least one data transmission interface for connecting the adjustment device to an operating unit, and at least one adjustment device debug interface for connecting the adjustment device to the control device debug interface of the control device.

BACKGROUND

As used herein, a control device will be understood to mean any type of electronic device with whose aid physical technological processes are adjusted. Customarily, such a control device comprises as least one arithmetic and logic unit, e.g. in the form of a processor or microcontroller, memory, and input/output interfaces (I/O interfaces) in order to be able to carry out calculations as a function of internally stored parameters or internal computational variables and/or of measured, or externally provided, quantities, and likewise to be able to act on external processes through the output of electrical signals. Thus, control devices do not operate, in the sense of control technology, only as controls, but rather they are also suitable for realizing complex control objectives. When in the following we speak of control devices, controls, and the process of control, we will also always include devices and activities according to the general definitions given above.

Furthermore, the discussion herein relates to various microcontrollers. By this are understood electronic computer units with associated electronic memory, independently of whether the memory is realized entirely or partially in one structural part with the computer, or whether computer unit and the associated memory are present as components separate from one another.

The use of adjustment devices becomes clear through the following presentation of the development process which control devices, at least in the context of extensive objectives, run through in practice.

At the beginning of a control technology project typically comes the mathematical modeling and simulation of the physical technological process on which a desirable dynamic behavior is intended to be imposed. With the aid of the resulting abstract mathematical model, various control concepts, which also exist only as mathematical models, can be tested in the framework of numerical simulations. This step represents the phase of modeling and controller design usually based on computer-supported modeling tools.

The controller designed in the mathematical model is transferred to a unit capable of real-time simulation, which usually in its computational power as well as with regard to its I/O capabilities far exceeds a customary production-model control device and is interactively connected to the real physical process. Since the transfer of the abstractly formulated controller from a modeling tool to the simulation unit is done substantially automatically, one speaks in the second phase of rapid control prototyping (RCP) or function prototyping.

If the control technology problem is solved with the controller operated on the simulation unit, the control algorithm is transferred in the framework of the control device implementation, in most cases entirely automatically, to the (production-model) control device ultimately to be used in practice.

The control device which is, in principle, then usable in the real process is, before its use, frequently first subjected to a test by the real process with which the control device is ultimately intended to interact being partially or completely simulated by a unit capable of real-time simulation and the control device being stimulated by signal test patterns (hardware-in-the-loop simulation). The control device tested in this manner is ultimately used in the real process and operated interactively with it.

Despite the extensive tests carried out in advance it is usually necessary to make adjustments to the control device or to the functions implemented in the control device. For this it is necessary, for one thing, to be able to monitor, record and analyze in real time the state of the control device, i.e. all the data input or output as well as used internally by the control device per data acquisition. For another thing, it is necessary through write access to the memory of the control device to be able to change the parameters or sets of parameters on which the functions or control algorithms are based, i.e. characteristic values, characteristic curves, or characteristic fields. The processes described are designated collectively as control device applications or calibrations.

If not only parameters of functions of the control device, i.e. data stored in the memory of the control device, but rather the functions implemented in the control device are themselves supposed to be changed as a test, so-called function bypassing comes into use, in which the control device of a real-time simulation unit signals the call of a control device function but the control device itself does not execute the function but rather only accepts and makes further use of the result of the function calculated as a substitute on the simulation unit. A bypass of the control device function therefore takes place.

In both scenarios described, the control device application and the function bypassing, it is necessary to provide special access to the control device, via which monitoring and active adjustment of the control device is possible.

From practice, essentially two methods are known via which adjustment devices obtain access to control devices.

With the use of a parallel interface, interventions in the hardware of the control device are usually necessary since the adjustment device in this case operates as a memory emulator and, for example, via an adapter which takes the place of a memory chip of the control device or is received by a slot on the printed circuit board of the control device, specifically a slot provided especially for it, and accesses the address and data bus of the control device microcontroller (e.g. dSPACE Product Catalog 2004, pages 292-293). Along with this, the adjustment device itself comprises, as a central element, a dual-port memory and a data transmission interface via which the adjustment device is connected to an operating unit. On the operator unit side the dual-port memory can then be read and written to by an operator, where the data stored in the dual-port memory of the adjustment device can be read automatically from the control device microcontroller since, due to the coupling to the data bus and the address bus of the control device microcontroller, the dual-port memory is located in the address space of the microcontroller.

However, in practice, not only are the described changes to the hardware made, but modifications to or enhancements of the control device program running on the control device are also made. This is done, for example, in order to also make internal data stored in the integrated memory of the control device microcontroller monitorable and changeable. For this, additional software services are implemented in the control device which copy internal data from the control device microcontroller into a memory area of the microcontroller, where that memory area lies within the control device microcontroller's address space accessible via the external address bus and data bus. Conversely, there are also software services which copy data from the control device microcontroller's address space accessible via the external address bus and data bus into the internal memory area of the control device microcontroller.

For the transfer of data, an address list and a data list are thus provided in the address space of the control device microcontroller, where either the address list contains those addresses in the address space of the control device microcontroller whose data are intended to be read and stored at a location in the data list or the address list contains those addresses in the address space of the control device microcontroller whose contents are intended to be written with corresponding data from the data list.

Thus, the process described above is, among other things, disadvantageous because the address list and the data list as well as the software services occupy additional memory space within the control device and the execution of the software services ties up computational power of the control device microcontroller which is not needed for the sole execution of the control functions of the control device. The behavior of the control device in the control device application can thus, under certain circumstances, hardly be comparable to the behavior which the control device would exhibit without the additional execution of the software services serving the application.

An additional method for an adjustment device accessing a control device consists in the use of serial interfaces (see, for example, dSPACE Product Catalog 2004, pages 84-85) with which modern control devices are customarily equipped. Here an intervention in the hardware of the control device in regard to the use of a parallel interface is no longer required. However, the control device must be equipped with additional software services in order to be able to carry out a data exchange via the serial interface, e.g. with an adjustment device. The present invention proceeds from adjustment devices of this type.

The address list and the data list described above, and used in the process using a parallel interface, as well as the software services for copying data into and out of the data lists are also used in the serial process so that on the whole a greater load on the control device microcontroller as well as a higher expenditure of memory on the control device results due to the greater number of software services.

Modern control devices are increasingly equipped with microcontrollers which comprise a debug interface, such as, for example, NEXUS (IEEE-ISTO 5001: "The NEXUS 5001 Forum Standard for a Global Embedded Processor Debug Interface," 2003).

Debug interfaces offer far-reaching possibilities for monitoring and adjusting states of the microcontroller and they make possible run-time monitoring and control (debugging) of the microcontroller, in particular therefore tracking of the execution of the program code and the data accessed and changed in so doing. Due to the fact that the debug interfaces are an integral part of the microcontroller hardware, faster access to the microcontroller can clearly be realized with them than is possible through a software-based communications interface.

To the applicant it is known from practice for the application of a control device with a control device debug interface to use an adjustment device which uses the control device debug interface for the adjustment of the control device, where, however, address lists and data lists continue to be created in the memory of the control device and the software services described above are used for copying data into and out of the data lists.

Through the use of the address lists and data lists located in the memory of the control device microcontroller and corresponding software services for copying and sending data into and out of the lists, the control device microcontroller is, however, also significantly loaded in this realization.

The above-described use of software services on the control device also leads in particular to it being hardly possible in practice to simultaneously carry out on the control device a control device application and a function bypass since the data communications based on software services quickly leads to a heavy load on the control device microcontroller and thus to unacceptable response times in the data transmission between the adjustment device and the control device. For this reason, only adjustment devices are known in practice with which either the application of control devices or a function bypass with the control device can be carried out but not both simultaneously.

An additional disadvantage in the use of software services on the control device is the fact that the software services first must be implemented on the control device, which usually makes necessary an intensive collaboration with, and thus a close connection to, the manufacturer of the control device. This is accepted less and less in industrial development.

SUMMARY

One aspect of the current invention is an adjustment device for adjusting a control device of such a type that the control device is less heavily loaded by the control device application than is the case with the use of known adjustment devices.

This aspect of the current invention is generally accomplished by the fact that the adjustment device comprises at least one memory for at least one address list and at least one data list, where the addresses stored in the address list denote memory locations in the address space of the control device microcontroller and where, with the use of the adjustment device debug interface, data from the memory locations which are in the address space of the control device microcontroller and which are determined by the contents of the address list can be read and stored in the data list of the adjustment device and/or the data stored in the data list of the adjustment device can be stored at the memory locations which are in the address space of the control device microcontroller and which are determined by the contents of the address list.

The adjustment device according to one aspect of the invention can exchange data at least via two interfaces, namely a data transmission interface and an adjustment device debug interface.

In this connection, the data exchange with the control device to be adjusted is carried out via the control device debug interface, which according to this aspect of the invention under discussion here, at least partially realizes the functionality in order, via a suitable set of commands for the interface to be able to automatically read out and actively adjust the state of the control device microcontroller and, in part, even of the units associated with it in the control device, such as, for example, its external storage. Control device debug interfaces are therefore distinguished by the above-described properties and consequently here this designation is also understood to mean those interfaces which in fact are not provided primarily as "debug interfaces," and thus are not explicitly designated as such, but which offer the corresponding monitoring and adjustment capabilities with regard to the control device microcontroller and the electronic units associated with it.

Through the use of such interfaces it is therefore possible with the use of adjustment devices according to one aspect of the invention to very largely omit software services used on the control device to implement the described functionality of the control device debug interfaces.

The data transmission interface serves for exchanging data between the adjustment device and an operating unit which as a rule is the interface used by a human user, the operator. Customarily, the operating unit is a stand-alone computer on which application software is run, i.e. programs for data acquisition, data visualization, and data analysis as well as programs for user-friendly input and management of parameter sets which are to be tested on the control device to which the operating unit is connected via the adjustment device.

The existence of the data transmission interface does not imply that the adjustment device according to this aspect of the invention and the operating unit are two different units separated from one another. Customarily, adjustment devices are embodied from the standpoint of their dimensions to be as small as possible and separated from the operating unit, since they, for example, are mounted within a motor vehicle, but it is entirely conceivable that the adjustment device according to the invention and the operating unit are realized in one unit in the sense of device technology.

The adjustment device according to another aspect of the invention furthermore comprises at least one programmable unit which, for example, controls the internal data flow from the data transmission interface to the adjustment device debug interface and conversely.

The adjustment device according to a further aspect of the invention furthermore comprises a memory in which at least one address list and at least one data list are stored, therefore those lists which with the use of known adjustment devices are stored and managed on the control device.

Along with this, the data stored in the address list denote memory locations in the address space of the control device microcontroller, where it is either possible to read the data from the control device and stored at the reference memory locations and to store them at corresponding locations in a data list of the adjustment device (data acquisition) or to write the data contained in a data list of the adjustment device at corresponding memory locations in the control device which are predefined by the contents of the address lists of the adjustment device (parametrization).

The data lists are consequently not only used in the interaction between the adjustment device and the control device but rather also in the cooperation of the adjustment device and operating unit since the data sets predefined by the operating unit are written in the data lists in order to be transmitted from there further into the control device just as the data sets of measured state variables of the control device are first stored in the data lists in order to be transmitted automatically from there further into the operating unit.

Due to the development according to one aspect of the invention of the adjustment device, in particular due to the storing of the address list and the data list in the memory of the adjustment device, the control device connected to the adjustment device no longer has to be adapted by modification of the control device software, which significantly simplifies the development process of the control device since this eliminates the necessity of integrating software services as well as the address list and the data list into the control device in collaboration with the manufacturer of the control device, which is required with any new edition of the software.

Along with this advantage relating to the development process, an additional technical advantage of the adjustment device according to one aspect of the invention consists in the fact that the execution of the control program on the control device is clearly less affected by access via the control device debug interface than is the case with the use of software services since they have to be implemented in addition on the control device microcontroller, whereas the functionality of control device debug interfaces for the most part is implemented purely by means of circuit technology and thus the operation of the control device debug interface parallel to the control device microcontroller is possible. Obviously, slight impacts on the control device microcontroller due to the control device debug interface are possible, for example, if the control device debug interface accesses a resource of the control device microcontroller which it would like to use at the same time.

A particularly advantageous development of the adjustment device according to another aspect of the invention follows in particular when the programmable unit of the adjustment device is a programmable logic chip. If, in addition, the adjustment device debug interface is realized with the aid of the programmable unit, i.e. in the form of a programmable logic chip, significant advantages result, e.g. vis-à-vis the implementation of the control device debug interface with a microcontroller. This is based on the fact that a microcontroller can customarily process instructions only sequentially, whereas programmable logic chips can execute several functions in parallel. Particularly, a field programmable gate array (FPGA) is used as the programmable logic chip in the adjustment device according to one embodiment of the invention.

With an adjustment device formed in such a manner, via the adjustment device and the control device debug interface, transmission rates can be achieved which, under certain circumstances, are a multiple greater than those which can be achieved with the known software services for communications on a control device.

Quite generally, it has turned out to be advantageous in the adjustment device according to another aspect of the invention if properties extending beyond the basic functionality described are implemented centrally at one location through the programmable unit. For this reason, the memory for the address list and the data list is also provided as a part of the programmable unit, whereby very short access times to the lists result when frequently used functionalities are also carried out by the programmable unit, for example.

Quite generally, this relates, for example, to a list application unit as a component of the programmable unit which after its activation automatically stores complete data lists or their contents from the adjustment device in memory locations in the address space of the control device microcontroller which are predefined by the data in the corresponding address lists. Conversely, the list application unit also serves to describe the data lists of the adjustment device with data which are read from the memory locations in the address space of the control device microcontroller, where the memory locations are determined by the data in corresponding address lists.

By the described development of the adjustment device according to one aspect of the invention, the control device or the control device microcontroller is significantly relieved of load and far higher transmission rates between the adjustment device and the control device can be achieved. This also ultimately makes it possible to realize additional functions on the adjustment device so that, for the user of the adjustment device, different development processes can be executed, seemingly in parallel with the control device.

In this connection, particular importance is accorded to the feature of providing, on the programmable unit of the adjustment device, a bypass unit, together with a single-port or dual-port bypass memory associated with this bypass unit and a bypass interface for connecting the bypass unit and the bypass memory to an external simulation unit. The mode of function of the bypass unit and the other elements associated with it will be explained in more detail below.

As soon as more than one functional unit is implemented on the programmable unit of the adjustment device, there is the danger of a conflict when the different units are running simultaneously. Through an additional feature to which a particular importance is accorded, namely the prioritization and arbitration unit, a strategy for conflict avoidance on activation of different functional units of the programmable unit is implemented in one example embodiment of the adjustment device according to one aspect of the invention. Through the prioritization and arbitration unit, priorities can be assigned to the various units provided on the programmable unit, such as, for example, the list-application unit and the bypass unit, and the prioritization and arbitration unit then decides with the aid of the priorities assigned to the stated units on the order of execution of the different units through their activation. Simultaneously, a data connection between each activated unit and the control device is produced by the prioritization and arbitration unit.

It is therefore significant that by activation of various units on the programmable unit of the adjustment device, and in given cases by rapid change-over between different activated units, different data sources or data targets can communicate via a single common data path, namely the data connection between the control device debug interface and the adjustment device debug interface. Due to the significant increase in speed the different units can also be operated in a quasi-parallel mode in very demanding applications.

Along with the adjustment device according to the invention, the invention also comprises a process for the use of a preferred adjustment device with a bypass unit for the advantageous realization of the function bypassing, where the described address list and/or data list is also used for bypassing.

DETAILED DESCRIPTION

Figure 1:
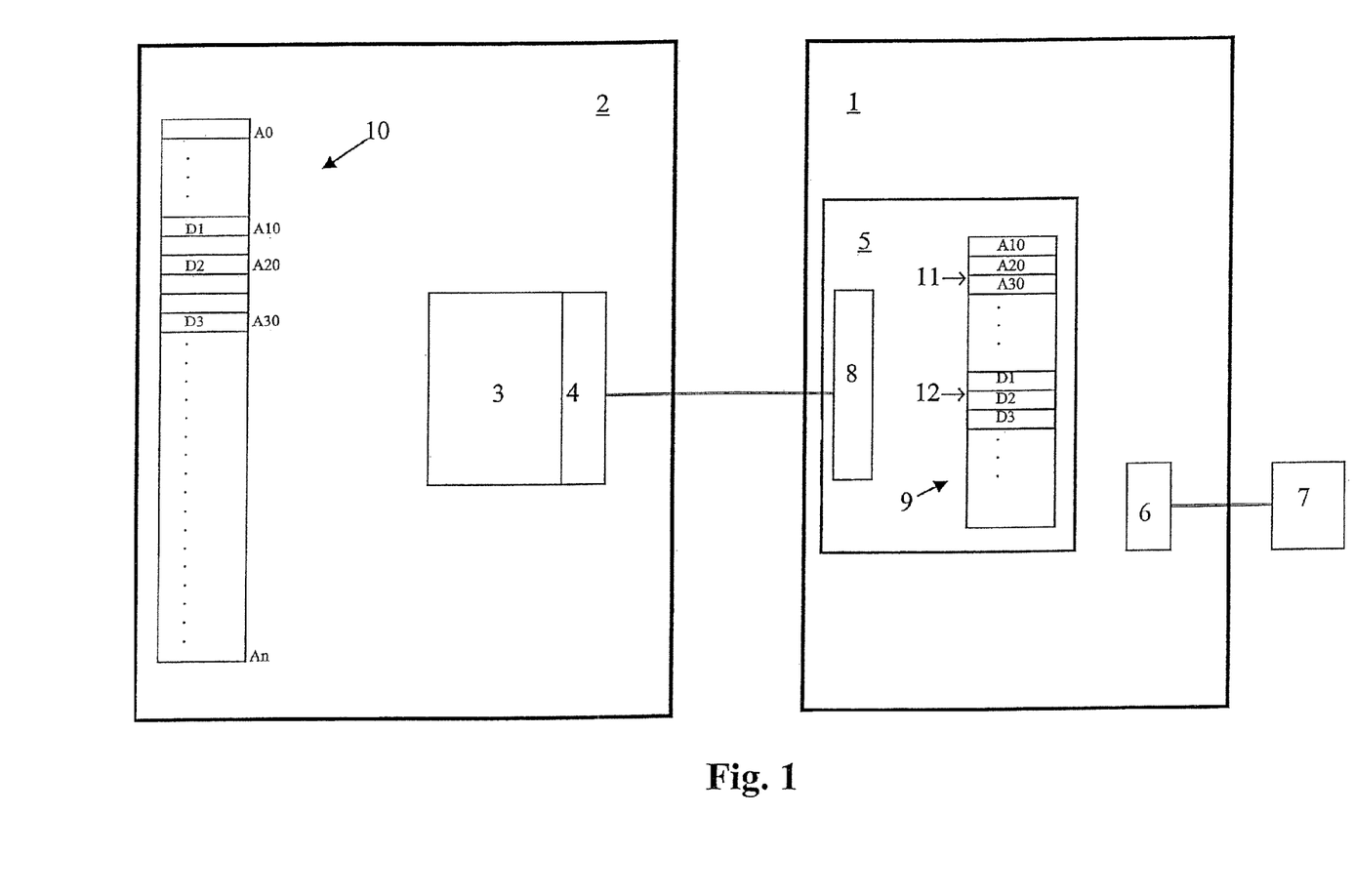
FIG. 1 shows one example schematic structure of an adjustment device according to the invention.
Figure 2:
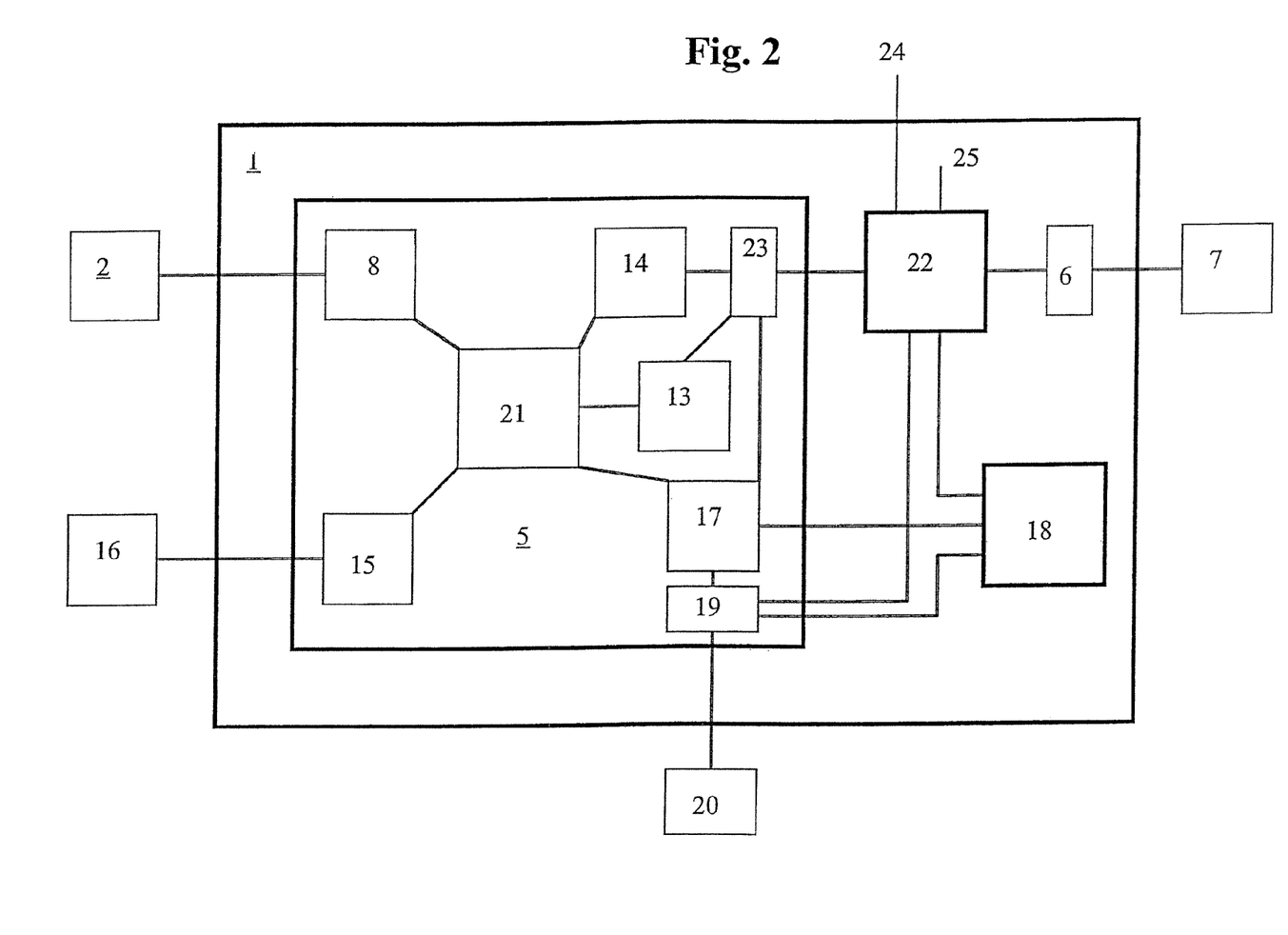
FIG. 2 shows another example schematic representation of an adjustment device according to the invention.
Figure 3:
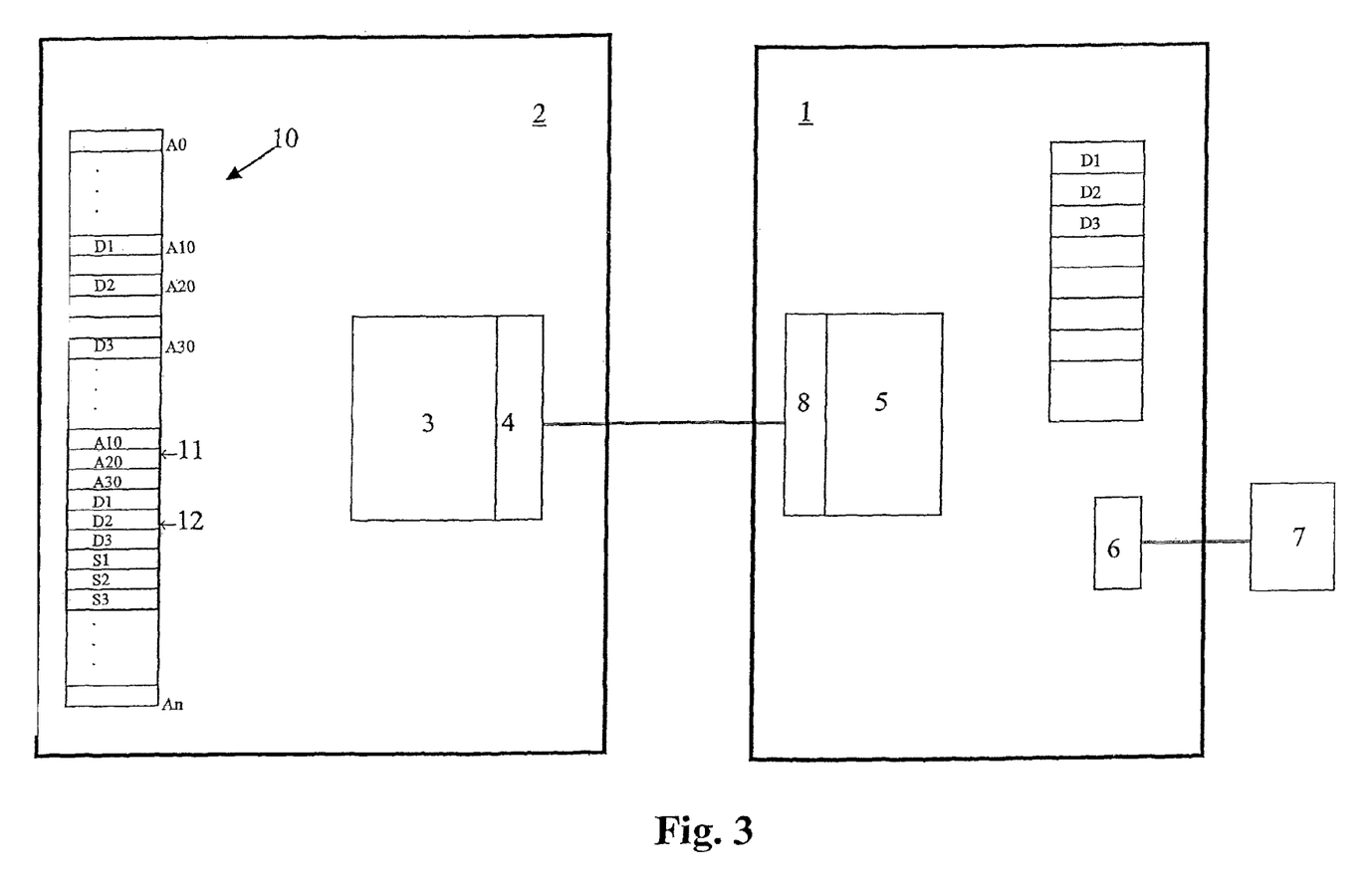
FIG. 3 shows the schematic structure of an adjustment device from the known state of the art.

The Figures each show an adjustment device 1 which is connected to a control device 2, where the control device 2 comprises at least one control device microcontroller 3 and a control device debug interface 4. The control device microcontroller 3 does not necessarily have to be a computer unit in which the processor and associated memory are realized in one unit, but rather the control device microcontroller 3 can just as well comprise, for example, a processor and a separately embodied memory chip.

The control device debug interface 4 represented in FIGS. 1 and 3 may be embodied in one unit with the control device microcontroller 3 (on-chip debug port) but naturally the adjustment device 1 according to the invention can also be used together with a control device 2 whose control device debug interface 4 is embodied separately from the control device microcontroller 3.

FIG. 3 shows the use of an adjustment device 1 which is known from the state of the art and which comprises a programmable unit 5 as well as a data transmission interface 6 via which a bidirectional data exchange between the adjustment device 1 and an operating unit 7 is made possible. As represented in the example embodiments, the operating unit 7 is a microcomputer with software suitable for visualizing the data coming from the control device 2 and picked up by the adjustment device 1 and transmitted further and for analyzing that data in the broadest sense. Furthermore, however, additional software also operates on the operating unit 7, where that software serves to configure the adjustment device 1 or with which it is possible to determine changes of parameters located on the control device 2 and transmitted to the control device 2 via the adjustment device 1. The data transmission interface 6 in the embodiment examples represented is a standard serial interface, in particular a USB interface or an Ethernet interface.

Moreover, each of the adjustment devices 1 represented in the Figures comprises an adjustment device debug interface 8, which is functionally necessary in order to produce a connection between the control device 2 and the adjustment device 1.

In FIG. 3, describing the state of the art the address space 10 of the control device microcontroller 3 is indicated within the control device 2, where the address space includes the addresses A0 to An. Here, let it be understood that the term "address space" refers to all the addresses accessible by the control device microcontroller 3, even those addresses which, for example, cannot be accessed via an external address bus of the control device microcontroller 3. In order to transmit data from the address space 10 of the control device microcontroller 3 into the adjustment device 1 and from there into the operating unit 7, an address list 11 as well as a data list 12 is created on the control device 2. There, the address list 11 and data list 12 occupy additional memory space along with the memory space which is occupied by the control software routinely operated on the control device 2.

In order to make the data D1, D2, and D3 in the addresses A10, A20, and A30 available to the adjustment device 1, the addresses A10, A20, and A30 are first stored in the address list 11. The software services needed in addition and indicated by S1, S2, and S3 serve to copy the original data D1, D2, and D3 from the memory locations A10, A20, and A30 into the data list 12. These data are transmitted from the control device 2 to the adjustment device 1 with the use of a known adjustment device 1 by additional software services to be implemented on the control device and not represented in more detail in FIG. 3. FIG. 3 makes it clear that the control device application using an adjustment device 1 known from the state of the art significantly loads the control device 2, on the one hand by the, under certain circumstances very great, demand for memory on the control device 2 by storing the address list 11, data list 12, and additional software services and, on the other hand, by the run-time behavior of the control functions of the control device which, in given cases are heavily impacted since the indicated software services (S1, S2, S3) must be processed in addition by the control device microcontroller 3.

FIG. 1 shows the comparable situation with the use of an adjustment device 1 according to one embodiment of the invention. In the memory 9 of the adjustment device 1, the address list 11 and the data list 12 are stored according to this embodiment of the invention. By transferring the data contained in the address list 11 to the adjustment device debug interface 8 the contents of the corresponding memory locations in the address space 10 of the control device microcontroller 3 can be called directly and they can subsequently be stored in the data list 12 provided for them in the memory 9 of the adjustment device 1. From there, the data can be transmitted to the outside, precisely as in the adjustment device 1 known from the state of the art, via other interfaces, such as, for example, the data transmission interface 6. Following the same principle, the data stored in the data list 12 can be transmitted via the control device debug interface 4 directly into the address space 10 of the control device microcontroller 3 and in fact to the addresses which are named by the address list 11 on the adjustment device 1.

As can be seen from FIG. 1, any modifications in the address space 10 of the control device microcontroller 3 are omitted when using the adjustment device 1 according to this embodiment of the invention in the case of the pure control device application. Thus, the run-time behavior of the control device 2 is not impacted, or is impacted only insignificantly, by the reading out or writing of the memory 9 of the control device 2 resulting in the course of the control device application.

FIG. 1 also shows that in this embodiments the adjustment device debug interface 8 is realized within the programmable unit 5. For example, when the programmable unit 5 is a programmable logic chip, significant advantages with regard to the speed of execution of different operations on the adjustment device 1 follow from this preferred arrangement. Making the programmable unit 5 a field programmable gate array (FPGA) is one example embodiment.

For the same reason, the memory 9 accommodating the address list 11 and the data list 12 is also provided within the same programmable unit 5 in the embodiment according to FIG. 1.

FIG. 2 shows an adjustment device 1 according to one embodiment of the invention and comprises a plurality of additional components and functions wherein different functional units such as, for example, a list applications unit 13, an individual value application unit 14, or a tool interface unit 15, are located in the programmable unit 5.

The list application unit 13 automates the transmission of data from the data lists 12 not represented in FIG. 2 into the locations designated by the addresses in the address list 11 with the address space 10 of the control device 2. Conversely, the list application unit 13 also ensures that complete parameter sets are called from the address space 10 of the control device microcontroller 3 and are transmitted together into the corresponding data lists 12 in the adjustment device 1.

In case several address lists 11 and data lists 12 are created within the memory 9, the address lists 11 and/or the data lists 12 can be provided with priorities, where the priorities determine in what processing order the list application unit 13 processes the lists.

Moreover, it is possible in an additional embodiment of the adjustment device 1 to select from several address lists 11 and several data lists 12 a subset of lists which is intended to be made accessible for processing by the list application unit 13. Thereby it is, for example, possible to select and switch different applications modes.

By periodic calling of the list application unit 13 it is thus possible in a simple manner to continuously monitor and evaluate entire sets of state variables of the control device 2 (data acquisition).

The individual application unit 14 serves essentially to read out, or optionally to write, individual states or memory contents from the address space 10 of the control device microcontroller 3. It is thus suitable for the manual and targeted change of control device parameters, or for random sample monitoring of an interesting state of the control device 2.

In an additional example embodiment of an adjustment device 1 according to an aspect of the inventions the programmable unit 5 comprises a tool interface unit 15, via which it is possible to connect an external device 16 to the adjustment device 1. The external device 16 can, for example, be an additional adjustment device 1 which is intended to be able alternatively to access the control device 2 via the control device debug interface 4, or the external device 16 can, for example, be an original debug tool which can also optionally access the control device 2.

The adjustment device 1 according to the invention can, moreover, be equipped with a bypass unit 17, a bypass memory 18, and a bypass interface 19, where the bypass unit 17 and the bypass interface 19 are preferably located with the programmable unit 5.

The bypass memory 18 is a dual-port memory which permits a write/read access on the part of the control device 2 as well as a write/read access on the part of a simulation unit 20 which via the bypass interface 19 is connected to the adjustment device 1. In an additional example embodiment not represented here, the bypass memory 18 is only a single-port memory, which, however, must not have a disadvantageous effect on function bypassing.

Function bypassing depends to some degree on rapid calculation of the functions stored on a simulation unit 20 just as on rapid data transmission of the result values calculated in the simulation unit 20 into the control device 2. For this reason, the bypass interface 19 is a serial interface which permits the highest data transmission rates. In the example embodiment represented in FIG. 2 the bypass interface 19 is an LVDS interface.

For function bypassing it is also necessary when using an adjustment device 1 according to one aspect of the invention to operate a software service on the control device 2 for each control device function to be avoided through bypassing. It is the objective of such a software service to signal to the adjustment device 1, and thereby also directly to the simulation unit 20, that a control device function to be calculated externally has been called, whereby a corresponding replacement function is immediately calculated on the simulation unit 20, where the results calculated by the simulation unit 20 are stored in the dual-port bypass memory 18 or single-port bypass memory and from there can be transmitted back into the control device 2 via the programmable unit 5.

For function bypassing it is necessary, in principle, according to one aspect of the invention, that the simulation unit 20 can request, and read out via the adjustment device 1, data from the control device 2 as well as transmit data itself via the adjustment device 1 and can write into the control device 2. The reading of data from the control device 2 by the simulation unit 20 begins with the simulation unit 20 transmitting the specification of all data to be read from the control device 2 to the adjustment device 1, in particular to the bypass unit 17 or the bypass memory 18. Specifying all the data to be read from the control device consists in one example embodiment in specifying at least one memory location in the address space 10 of the control device microcontroller 3 and in specifying the size of the interesting memory area extending from there. The adjustment device 1, in particular, the bypass unit 18, then reads the data thus specified from the control device 2 using the debug interfaces 4, 8, and subsequently the data read by the adjustment device 1 from the control device 2 are transmitted via the bypass interface 19 to the simulation unit 20.

The writing of data, functionally necessary for function bypassing, from the simulation unit 20 into the control device 2 via the adjustment device 1 begins with the transmission of the specification of the memory locations which are in the address space 10 of the control device microcontroller 3 and which are to be described and the data themselves which are intended to be stored at these memory locations. These data, according to one example embodiment are stored in the bypass memory 18 of the adjustment device 1. Subsequently, the data are stored in the specified memory locations in the address space 10 of the control device microcontroller 3 by the adjustment device 1 using the debug interfaces 4, 8.

If a function of the control device 2 is not intended to be calculated by the control device microcontroller 3 but rather relocated on the simulation unit 20, therefore by function bypassing, a request for the calculation of this relocated bypass function is first sent from the control device 2 to the adjustment device 1 via the debug interfaces 4, 8, where the request is, without delay, transmitted further from the adjustment device 1 to the simulation unit 20 so that the bypass function can be calculated on the simulation unit 20 as free of delay as possible. The simulation unit 20 evaluates the request for calculation of the bypass function and reads the data necessary for the calculation of the function (arguments of the function) from the control device 2 according to the processes described.

After the simulation unit 20 has calculated the relocated function on the basis of the data read from the control device 2, the simulation unit 20 writes the results of the function calculation according to the method described above via the adjustment device 1 into the control device 2 or to corresponding memory locations in the address space 10 of the control device microcontroller 3.

The method of function bypassing previously described in detail and using the adjustment device 1 according to that aspect of the invention is independent of the address list 11 and the data list 12 in the memory 9 of the adjustment device 1.

In an additional example embodiment of the adjustment device 1 according to the invention some importance is, however, also accorded to the address list 11 and the data list 12 of the adjustment device 1 with respect to function bypassing.

By using the address list 11 and/or the data list 12 in function bypassing, significant advantages vis-à-vis the above-described method of bypassing can be achieved. In order to be able to use the address list 11 and/or the data list 12 for bypassing a control device function through a corresponding bypass function on the simulation unit 20, it is first necessary that the memory locations of the data which are in the address space 10 of the control device microcontroller 3 and are necessary for the calculation of the bypass function are stored or have been stored in the address list 11. These data must be stored in the address list 11 or several address lists 11 for each individual control device function to be avoided by bypassing, and in fact only once for arbitrarily many bypass processes of this function.

In order to exhaust the advantages of using the address list 11 and/or the data list 12 for bypassing it is, as in the control device application, advantageous if the adjustment device 1 automatically carries out the reading of the data from the memory locations given in the address list 11 in the address space 10 of the control device microcontroller 3 and the storing of the called data in the data list 12, with the use of the list application unit 13, for example.

If the control device 2 signals a necessary bypass process of a control device function to the adjustment device 1, all the data necessary for the calculation of the bypass function can be read by using the address list 11 as a unit of the control device 2 and can be stored on the adjustment device 1 using the debug interfaces 4, 8. If all the data necessary for the calculation of the bypass function are stored in the data list 12, they are transmitted automatically, or on request by the simulation unit 20, to the simulation unit 20, where they are drawn upon directly for the calculation of the bypass function. The results of the calculation of the bypass function by the simulation unit 20 are then transmitted to the adjustment device 1 and stored there either in the data list 12 and/or the bypass memory 18. From there, the results of the calculation are stored once again in certain memory locations in the address space 10 of the control device microcontroller 3, where the memory locations have either already been stored in the address list 11 or are specified by the simulation unit 20.

By this method of function bypassing, the constant transmission of the memory locations which are in the address space 10 of the control device microcontroller 3 and from which reading, or into which writing, is intended to take place is omitted, whereby the data transmission between the simulation unit 20 and the adjustment device 1 is significantly reduced. Furthermore, the time needed for bypassing a control device function is decisively shortened, which, among other things, is also due to the fact that the collective transmission of data between the adjustment device 1 and the control device 2 via the debug interfaces 4, 8 using the address list 11 and/or the data list 12 can be concluded significantly faster than transmitting the same data by a plurality of individual transfers.

Since, in one example embodiment of the adjustment device 1 according to FIG. 2, several functional units 13, 14, 15, 17 are implemented with the aid of the programmable unit 5, there is potentially the danger of a resource conflict to the extent that simultaneously activated functional units 13, 14, 15, 17 access the same resources, such as, for example, the adjustment device debug interface 8.

For the purpose of avoiding a collision, a prioritization and arbitration unit 21 is implemented in addition with the programmable unit 5. The prioritization and arbitration unit 21 permits assigning priorities to the various units 13, 14, 15, 17. With the aid of these priorities, the prioritization and arbitration unit 21 can establish an order of execution by activation of the different units 13, 14, 15, 17. It is in addition a part of the task of the prioritization and arbitration unit 21 to establish a data connection between the particular activated unit and the control device 2.

The conjunction of several properties of the described example embodiment of the adjustment device 1 according to various aspects of the invention (relieving the load on the control device microcontroller 3 by elimination of software services in data acquisition, logical utilization of the control device debug interface 4, hardware conversion of the functional units in the programmable unit 5) leads to different functional units being able to share in an effective manner a single access to the control device 2 and it also leads, for the user of the adjustment device 1, to the possibility of simultaneous use of the control device 2 by different functional units.

The example embodiment represented in FIG. 2 permits the simultaneous execution of a control device application. This has rendered, data acquisition associated with substantial data transmission and function bypassing, which is known from the state of the art practically impossible to accomplish in a satisfactory manner since the data transmission from control device 2 to the adjustment device 1 based on software services is far more time-consuming and leads to response times which are no longer acceptable.

In practice, it has turned out to be particularly advantageous if the priority of the bypass unit 17 is chosen to be higher than the priority of the list application unit 13 which, in turns is to be set higher than the priority of the individual value application unit 14, and if the smallest priority is assigned to the tool interface unit 15. Depending on the instance of application, it can however be logical to give the tool interface unit 15 the highest priority, for example, if an adjustment device 1 is also used as an external device 16.

In an additional example embodiment a coordination unit 22 is provided in the adjustment device 1, where the coordination unit is connected via a coordination interface 23 to one or more of the units 13, 14, 17 of the programmable unit 5, where the coordination interface 23 is integrated, for example, into the programmable unit 5.

Moreover, the coordination unit 22 is connected in one example embodiment to the operating unit 7 via the data transmission interface 6 and/or to the simulation unit 20 via the bypass interface 19 and/or also to the bypass memory 18. With this, the coordination unit 22 is in the position to direct data or instructions coming from the operating unit 7 and/or from the simulation unit 20 to the addressed units 13, 14, 15, 17 of the programmable unit 5 for further processing and/or to transmit the data from a unit 13, 14, 15, 17 of the programmable unit 5 to the operating unit 7 and/or the simulation unit 20.

In this connection, a general remark relating to the connections between various units and represented in the figures will be made. In principle, the connections represent communication paths between their endpoints. They can actually represent a separate physical connection but do not have to. This becomes clear, for example, by considering the bypass memory 18 which is represented in FIG. 2 and comprises three connections even though it is only a dual-port memory or single-port memory. Several communications partners, in the present case therefore, the bypass unit 17, the bypass interface 19, and the coordination unit 22, can access, for example, via a common physical communications path, an additional unit, here therefore the bypass memory 18.

An additional embodiment of an adjustment device 1 permits providing the data received from the coordination unit 22, for example, data which are transmitted to the operating unit 7, with a time stamp. This is advantageous because the time information of the time stamp permits temporal indexing, for example, of measured data, as well as, for example, making possible a temporal synchronization of several adjustment devices 1 operated in one network.

An alternative embodiment of the adjustment device 1 already applies a time stamp to the data running through the programmable unit 5 so that this operational step no longer has to be carried out by the coordination unit 22. Also in this variant, temporal advantages vis-à-vis using the coordination unit 22 can be achieved.

The coordination unit 22 serves, for example, to interpret configuration instructions coming from the operating unit 7 and/or from the simulation unit 20 and to configure the adjustment device 1 accordingly. Thus, it is, for example, even possible to set up the adjustment device 1 according to the invention not only for a special type of control device debug interface 8 but rather to adapt it to practically any interface standards.

As represented in FIG. 2, the coordination unit 22, for example, also comprises connections via which external trigger signals 24 as well as internal trigger signals 25 can be registered and evaluated, on account of which, with the coordination unit 22, it is possible in a simple manner to activate corresponding units 13, 14, 15, 17 of the programmable unit 5.

The coordination unit 22 is located embodiment according to FIG. 2, by a separate computer unit outside of the programmable unit 5, for example, by a microcontroller. In an additional variant of the adjustment device 1, the coordination unit 22 is, on the contrary, formed by a programmable logic chip, or as a part of the programmable unit 5.

The invention claimed is:

1. An adjustment device for adjusting at least one control device with at least one control device microcontroller and with at least one control device debug interface, comprising:
at least one programmable unit comprising a programmable logic chip distinct from the control device microcontroller;
at least one data transmission interface connecting the adjustment device to an operating unit;
at least one adjustment device debug interface connecting the adjustment device to the control device debug interface of the control device;
the at least one programmable unit further comprising at least one memory for at least one address list and at least one data list, where the addresses stored in the address list denote memory locations in the address space of the control device microcontroller; and
where, with the use of the adjustment device debug interface, data from the memory locations in the address space of the control device microcontroller and as specified by the contents of the programmable unit address list can be read from the control device and stored in the programmable unit data list and/or the data stored in the programmable unit data list can be stored at the memory locations in the address space of the control device microcontroller and as specified by the contents of the programmable unit address list, and
wherein, the adjustment device comprises a coordination unit which is connected via a coordination interface to one or more of the units of the programmable unit and/or via the data transmission interface to the operating computer and/or via the bypass interface to the simulation unit and/or to the bypass memory.

2. The adjustment device according to claim 1, wherein the programmable unit comprises the adjustment device debug interface.

3. The adjustment device according to claim 1, wherein the programmable unit comprises a list application unit and by activation of the list application unit the list application unit automatically carries out either the calling of the data from the memory locations in the address space of the control device microcontroller and given in the address list and the storing of the called data in the data list or the writing of the data stored in the data list into the memory locations in the address space of the control device microcontroller and determined by the contents of the address list.

4. The adjustment device according to claim 3, wherein in the case of several address lists and/or several data lists, by issuing priorities for the address lists and/or data lists a processing order can be determined by the list application unit.

5. The adjustment device according to claim 3, wherein in the case of several address lists and/or several data lists a subset of address lists and/or a subset of data lists can be determined which is processed by the list application unit.

6. The adjustment device according to claim 1, wherein the programmable unit comprises an individual application unit with which any memory locations in the address space of the control device microcontroller can be read out and/or with which a value can be stored in any memory location in the address space of the control device microcontroller.

7. The adjustment device according to claim 1, wherein the programmable unit comprises a tool interface unit for connecting at least one external device to the adjustment device.

8. The adjustment device according to claim 1, wherein the programmable unit comprises a bypass unit with an associated single-port or dual-port bypass memory, an associated bypass interface for connecting the bypass unit and the bypass memory to an external simulation unit, where data can be exchanged between the control device and the simulation unit with the use of the bypass memory and the bypass unit reading and writing bi-directionally.

9. The adjustment device according to claim 8, wherein the programmable unit comprises the bypass interface, where the bypass interface uses a serial data transmission and is embodied as an Low-Voltage Differential Signaling interface.

10. The adjustment device according to claim 1, wherein the programmable unit comprises a prioritization and arbitration unit, where priorities can be assigned to the various units of the programmable unit via the prioritization and arbitration unit and the prioritization and arbitration unit determines, with the aid of the priorities assigned to the various units, the order of execution by activation of the various units among themselves and establishes a data connection between the unit activated in each case and the control device.

11. The adjustment device according to claim 10, wherein the priority of the bypass unit is higher than the priority of the list application unit and/or that the priority of the list application unit is higher than the priority of the individual value application unit and/or that the priority of the individual value application unit is higher than the priority of the tool interface unit.

12. The adjustment device according to claim 10, wherein the priority of the tool interface unit is higher than all the other units.

13. The adjustment device according to claim 1, wherein the coordination unit directs data or instructions coming from the operating computer and/or from the simulation unit to the addressed units of the programmable unit for further processing and/or transmits the data coming from a unit of the programmable unit to the operating computer and/or the simulation unit.

14. The adjustment device according to claim 1, wherein the coordination unit provides received data with a time stamp which are transmitted to the operating unit.

15. The adjustment device according to claim 1, wherein the coordination unit interprets configuration instructions coming from the operating unit and/or from the simulation unit and configures the adjustment device accordingly.

16. The adjustment device according to claim 1, wherein the coordination unit registers external trigger signals and/or internal trigger signals and activates corresponding units of the programmable unit.

17. The adjustment device according to claim 1, wherein the coordination unit is located in a separate computer unit outside of the programmable unit, in a microcontroller, in a programmable logic chip, or is formed as a part of the programmable unit.

* * * * *